(12) United States Patent
Wittmer et al.

(10) Patent No.: US 7,693,749 B2
(45) Date of Patent: Apr. 6, 2010

(54) SYSTEM AND COMPUTER PRODUCT FOR MANAGING PURCHASE ORDERS

(75) Inventors: Holger Wittmer, Volklingen (DE); Andreas Freitag, Saarbrücken (DE); Michael Haase, Bous (DE)

(73) Assignee: SAP AG, Walldorf (DE)

( * ) Notice: Subject to any disclaimer, the term of this patent is extended or adjusted under 35 U.S.C. 154(b) by 1309 days.

(21) Appl. No.: 11/075,391

(22) Filed: Mar. 8, 2005

(65) Prior Publication Data

US 2005/0203808 A1 Sep. 15, 2005

Related U.S. Application Data

(60) Provisional application No. 60/551,221, filed on Mar. 8, 2004, provisional application No. 60/563,284, filed on Apr. 16, 2004.

(51) Int. Cl.
G06Q 30/00 (2006.01)
(52) U.S. Cl. .......................................... 705/26; 705/27
(58) Field of Classification Search ..................... 705/26, 705/27
See application file for complete search history.

(56) References Cited

U.S. PATENT DOCUMENTS

| | | | |
|---|---|---|---|
| 4,752,877 A | 6/1988 | Roberts et al. | |
| 5,315,508 A | 5/1994 | Bain et al. | |
| 5,400,253 A | 3/1995 | O'Connor | |
| 5,500,513 A * | 3/1996 | Langhans et al. | 235/380 |
| 5,615,109 A | 3/1997 | Eder | |
| 5,621,201 A * | 4/1997 | Langhans et al. | 235/380 |
| 5,758,327 A | 5/1998 | Gardner et al. | |
| 5,870,716 A | 2/1999 | Sugiyama et al. | |
| 5,930,771 A | 7/1999 | Stapp | |
| 5,999,914 A | 12/1999 | Blinn et al. | |
| 6,029,139 A | 2/2000 | Cunningham et al. | |
| 6,064,984 A | 5/2000 | Ferguson et al. | |
| 6,341,351 B1 | 1/2002 | Muralidhran et al. | |
| 6,505,093 B1 | 1/2003 | Thatcher et al. | |
| 6,507,851 B1 | 1/2003 | Fugiwara et al. | |
| 6,701,299 B2 | 3/2004 | Kraisser et al. | |

(Continued)

FOREIGN PATENT DOCUMENTS

JP 2004-030343 A 1/2004

(Continued)

OTHER PUBLICATIONS

Goodwin, David, "The open-to-buy system and accurate performance measurement", International Journal of retail & distribution management, Mar. 1992.*

(Continued)

*Primary Examiner*—Mark Fadok
(74) *Attorney, Agent, or Firm*—Foley & Lardner LLP (57) ABSTRACT

A method of managing purchasing orders for a plurality of items to be purchased is shown. The method includes receiving a personal variant including search criteria associated with retail items to be used in populating an order list, populating a purchase order list based upon the personal variant, displaying the purchase order list including order list items satisfying criteria in the personal variant, receiving a selection of purchase order list items and providing a list of functions associated with the selected purchase order list items, and performing the selected functions on the order list item.

17 Claims, 7 Drawing Sheets

U.S. PATENT DOCUMENTS

| | | | |
|---|---|---|---|
| 6,725,204 | B1 | 4/2004 | Gusley |
| 6,868,528 | B2 | 3/2005 | Roberts |
| 6,910,017 | B1 | 6/2005 | Woo et al. |
| 6,980,966 | B1 | 12/2005 | Sobrado et al. |
| 7,080,030 | B2 | 7/2006 | Eglen et al. |
| 7,082,408 | B1 * | 7/2006 | Baumann et al. ............... 705/26 |
| 7,092,929 | B1 * | 8/2006 | Dvorak et al. ................. 705/28 |
| 7,117,165 | B1 | 10/2006 | Adams et al. |
| 7,124,098 | B2 | 10/2006 | Hopson et al. |
| 7,124,984 | B2 | 10/2006 | Yokouchi et al. |
| 7,139,731 | B1 | 11/2006 | Alvin |
| 7,343,315 | B2 * | 3/2008 | Wittmer et al. ................. 705/8 |
| 7,516,083 | B1 * | 4/2009 | Dvorak et al. ................. 705/10 |
| 7,523,048 | B1 * | 4/2009 | Dvorak ........................ 705/10 |
| 2001/0019778 | A1 | 9/2001 | Gardaz et al. |
| 2001/0032130 | A1 | 10/2001 | Gabos et al. |
| 2001/0039517 | A1 | 11/2001 | Kawakatsu |
| 2001/0049634 | A1 | 12/2001 | Stewart |
| 2002/0013731 | A1 * | 1/2002 | Bright et al. ................... 705/22 |
| 2002/0023500 | A1 | 2/2002 | Chikuan et al. |
| 2002/0026368 | A1 | 2/2002 | Carter, III |
| 2002/0059108 | A1 | 5/2002 | Okura et al. |
| 2002/0072986 | A1 | 6/2002 | Aram |
| 2002/0073114 | A1 | 6/2002 | Nicastro et al. |
| 2002/0078159 | A1 | 6/2002 | Petrogiannis et al. |
| 2002/0107713 | A1 | 8/2002 | Hawkins |
| 2002/0116241 | A1 | 8/2002 | Sandhu et al. |
| 2002/0123930 | A1 | 9/2002 | Boyd et al. |
| 2002/0138290 | A1 * | 9/2002 | Metcalfe et al. ................. 705/1 |
| 2002/0147668 | A1 | 10/2002 | Smith et al. |
| 2002/0152128 | A1 | 10/2002 | Walch et al. |
| 2002/0184116 | A1 | 12/2002 | Tam et al. |
| 2003/0023500 | A1 | 1/2003 | Boies et al. |
| 2003/0028393 | A1 | 2/2003 | Coulston et al. |
| 2003/0028437 | A1 | 2/2003 | Grant et al. |
| 2003/0046120 | A1 | 3/2003 | Hoffman et al. |
| 2003/0046195 | A1 | 3/2003 | Mao |
| 2003/0050852 | A1 | 3/2003 | Liao et al. |
| 2003/0074269 | A1 | 4/2003 | Viswanath |
| 2003/0126024 | A1 | 7/2003 | Crampton et al. |
| 2003/0144916 | A1 | 7/2003 | Mumm et al. |
| 2003/0149631 | A1 | 8/2003 | Crampton et al. |
| 2003/0149674 | A1 | 8/2003 | Good et al. |
| 2003/0158791 | A1 | 8/2003 | Gilberto et al. |
| 2003/0171998 | A1 | 9/2003 | Pujar et al. |
| 2003/0172007 | A1 | 9/2003 | Helmolt et al. |
| 2003/0200150 | A1 | 10/2003 | Westcott et al. |
| 2003/0208365 | A1 | 11/2003 | Avery et al. |
| 2003/0229502 | A1 | 12/2003 | Woo |
| 2004/0010463 | A1 | 1/2004 | Hahn-Carlson et al. |
| 2004/0098358 | A1 | 5/2004 | Roediger |
| 2004/0122689 | A1 | 6/2004 | Dailey et al. |
| 2004/0162763 | A1 | 8/2004 | Hoskin et al. |
| 2004/0172321 | A1 | 9/2004 | Vemula et al. |
| 2004/0186765 | A1 | 9/2004 | Kataoka |
| 2004/0186783 | A1 | 9/2004 | Knight et al. |
| 2004/0210489 | A1 | 10/2004 | Jackson et al. |
| 2004/0220861 | A1 | 11/2004 | Morciniec et al. |
| 2004/0267674 | A1 | 12/2004 | Feng et al. |
| 2005/0015303 | A1 * | 1/2005 | Dubin et al. ................... 705/26 |
| 2005/0055283 | A1 | 3/2005 | Zarovinsky |
| 2005/0060270 | A1 | 3/2005 | Ramakrishnan |
| 2005/0075915 | A1 | 4/2005 | Clarkson |
| 2005/0075941 | A1 | 4/2005 | Jetter et al. |
| 2005/0086122 | A1 | 4/2005 | Cirulli et al. |
| 2005/0096963 | A1 | 5/2005 | Myr et al. |
| 2005/0102175 | A1 | 5/2005 | Dudat et al. |
| 2005/0102192 | A1 * | 5/2005 | Gerrits et al. ................. 705/26 |
| 2005/0102227 | A1 | 5/2005 | Solonchev |
| 2005/0165659 | A1 | 7/2005 | Gruber |
| 2005/0171825 | A1 | 8/2005 | Denton et al. |
| 2005/0197912 | A1 * | 9/2005 | Wittmer et al. ............... 705/26 |
| 2005/0197913 | A1 * | 9/2005 | Grendel et al. ................. 705/26 |
| 2005/0197914 | A1 * | 9/2005 | Welter et al. .................. 705/26 |
| 2005/0197915 | A1 * | 9/2005 | Biwer et al. ................... 705/26 |
| 2005/0197918 | A1 * | 9/2005 | Wittmer et al. ............... 705/26 |
| 2005/0197921 | A1 * | 9/2005 | Abo-Hasna et al. ........... 705/26 |
| 2005/0197949 | A1 * | 9/2005 | Welter et al. .................. 705/37 |
| 2005/0203813 | A1 * | 9/2005 | Welter et al. .................. 705/27 |
| 2005/0216325 | A1 * | 9/2005 | Ziad et al. ...................... 705/8 |
| 2005/0216357 | A1 * | 9/2005 | Wittmer et al. ............... 705/26 |
| 2005/0216359 | A1 * | 9/2005 | Welter et al. .................. 705/26 |
| 2005/0216375 | A1 * | 9/2005 | Grendel et al. ................. 705/28 |
| 2005/0235020 | A1 * | 10/2005 | Gabelmann et al. ......... 707/205 |
| 2005/0240488 | A1 * | 10/2005 | Grendel et al. ................. 705/26 |
| 2005/0243792 | A1 * | 11/2005 | Simon et al. ................. 370/347 |
| 2005/0246482 | A1 * | 11/2005 | Gabelmann et al. ......... 711/111 |
| 2005/0251734 | A1 * | 11/2005 | Gabelmann et al. ......... 715/503 |
| 2006/0020512 | A1 | 1/2006 | Lucas et al. |
| 2006/0036061 | A1 * | 2/2006 | Pujar et al. .................... 705/26 |
| 2006/0112099 | A1 | 5/2006 | Musgrove et al. |
| 2007/0050272 | A1 | 3/2007 | Godlewski et al. |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System For Improving Promotion Productivity Using Store Scanner Data", Marketing Science, Summer 1993, vol. 12, No. 3, pp. 248-269.

Anon., "(A Lot of) Life After H. Ross: Electronic Data systems," Financial World, vol. 162, No. 22, p. 50, Nov. 9, 1993.

Author unknown, "Staffware: Staffware And Biomni Join Forces To Provide End-To-End E-Procurement Solution With Enhanced Workflow Capability: Self-Service Functionality Will Enable Thousands Of Transactions To Be Handled Daily From The Desktop," M2 Presswire, Coventry, Feb. 6, 2001, p. 1.

"Beyond Markdown Management", summer/autumn 03, the 4caster, Iss. 4, vol. 2.

Brown, "The Effects of Assortment Composition Flexibility on Operating Efficiency" (Abstract only), Dissertation Abstracts International, vol. 55/08-A, p. 2458.

Jensen et al., "Long-Term Construction Contracts: The Impact of Tamra '88 on Revenue Recognition", *Journal of Construction Education*, Spring 1997, vol. 2, No. 1, pp. 37-53.

U.S. Appl. No. 60/374,892, filed Apr. 22, 2002, Krajec.

Kelkar et al., Price Modeling in Standards for Electronic Product Catalogs Based on XML, 2002, pp. 366-375.

Melcher, Rachel, "Local tech firm creates retail markdown tool", Mar. 24, 2000, Cincinnati Business Courier, 3 pgs.

Profitlogic, available at http://web.archive.org/web/2002060311838/ http://profitlogic.com/, available at least by Apr. 15, 2005 (22 pp.).

"Retailers Manage Markdown Challenges Using i2 Solutions", Jan. 13, 2003, NFR 92nd Annual Convention & Expo, (2 pgs.).

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996 (p. 7(24)).

Wilson, "Changing the Process of Production," Industrial Management, vol. 37, No. 1, pp. 1-2, Jan./Feb. 1995.

* cited by examiner

Workbench  Edit  Goto  System  Help

Order List (Change)

Fast Data Entry

| OTyp | POrg | PGr | Plant | Vendor | Delivery date | Material | Order Quantity | OUn | Latest Ordr | Crcy | Adopt... | Net order price | F... | Per | O... |
|---|---|---|---|---|---|---|---|---|---|---|---|---|---|---|---|
| NB | ESLI | 001 | MLVZ | LIEF01 | 20.04.2005 | | | | | | | | | | 0 |

Generate Purchase Order
Generate Grouped PO Document

Order List Entries

| Sel... | Item No. | Type | POrg | PGr | Vendor | Material | | Matl Group | Plant | Order Quantity | Ne |
|---|---|---|---|---|---|---|---|---|---|---|---|
| ⇨ | 3 | NB | ELSI | 001 | LIEF01 | INFODAY3 | glove | WGR_MLA | MLVZ | 33 | |
| | 2 | NB | ELSI | 001 | LIEF01 | INFODAY4 | hat | WGR_MLA | MLVZ | 22 | |
| | 1 | NB | ELSI | 001 | LIEF01 | INFODAY3 | glove | WGR_MLA | MLVZ | 12 | |
| | 4300014678 | NB | ELSI | 001 | LIEF01 | INFODAY4 | Mutze | WGR_MLA | MLVZ | 12 | |
| | 4300014679 | NB | ELSI | 001 | LIEF01 | INFODAY3 | Handschuhe | WGR_MLA | MLVZ | 12 | |
| | 4300014682 | NB | ELSI | 001 | LIEF01 | INFODAY3 | Handschuhe | WGR_MLA | MLVZ | 12 | |
| | 4300014683 | NB | ELSI | 001 | LIEF01 | INFODAY3 | Mutze | WGR_MLA | MLVZ | 22 | |
| | 4300014709 | NB | ELSI | 001 | LIEF01 | INFODAY3 | glove | WGR_MLA | MLVZ | 2 | |

Date Line

| TC Extern. | ... | TC Description Ext. | To... | TC Intern. | ... | Internal Transportation Chain Descript | To... | Vendor | Material | Store | DC | Inc... |
|---|---|---|---|---|---|---|---|---|---|---|---|---|
| SCEN_2 | | carsten scenario 2 | 2 | | | | 0 | LIEF01 | INFODAY3 | MLVZ | CIF | IS |

SYSTEM AND COMPUTER PRODUCT FOR MANAGING PURCHASE ORDERS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present invention relates generally to the field of managing purchase orders. More particularly, the present invention relates to a system and method for managing purchase orders.

Providers of retail sales articles and services must seek to provide the right product, at the right place, at the right time. Particularly, with regard to sales of retail fashion articles, these articles often have a short life cycle, and new articles have to be presented quite frequently. At the same time, the consumers demand a wide assortment variety. Accordingly, large numbers of different fashion articles often have to be processed and procured within extremely short time frames. Alternatively, the procurement process may involve extended ordering times, wherein an order must be placed 6 months in advance.

Further, tracking inventory and budgets for seasonal items can be important to the profitability of a business. For example, identifying a particularly well selling items and ordering additional quantities to arrive on time and within a prescribed budget may increase the profitability of a retail location. Accordingly, it is important for a business to carefully plan and schedule purchasing orders for retail sales articles and services to ensure on-time procurement or scheduling within budget constraints.

The amount of information and the number of operations that are made available to a manger of multiple workbenches that is responsible for a large number of purchase orders can grow to be prohibitive. For example, a manager may be required to coordinate a large number of purchase orders, performing operations such as budget approval, coordinating delivery, managing missed delivery, updating orders based on current volumes, etc. Further, the manager may be responsible for a large number of purchase orders and need a system and method for grouping and coordinating the large volume, but also may need a system and method that allows drilling down through the data to access any particular purchase order to see status, make changes, etc.

In view of the foregoing, it would be beneficial to provide a system and method for managing purchase orders for sales articles and services to be purchased. It would further be beneficial to provide a purchase order manager configured to provide a single interface allowing access to underlying functionality allowing the user to manage the purchase orders. It would be further beneficial to provide a purchase order manager configured to facilitate creation, maintenance, procurement, and event-driven controlling for purchase orders in a single interface.

SUMMARY

According to an exemplary embodiment, a method of managing purchasing orders for a plurality of items to be purchased is shown. The method includes receiving a personal variant including search criteria associated with retail items to be used in populating an order list, populating a purchase order list based upon the personal variant, displaying the purchase order list including order list items satisfying criteria in the personal variant, receiving a selection of purchase order list items and providing a list of functions associated with the selected purchase order list items, and performing the selected functions on the order list item.

According to another exemplary embodiment, a system for organizing purchasing data for a plurality of items to be purchased is shown. The system includes means for receiving a personal variant including search criteria associated with retail items to be used in populating an order list, means for populating an order list based upon the personal variant, means for displaying the purchase order list including order list items satisfying criteria in the personal variant, means for receiving a selection of order list items and providing a list of functions associated with the selected order list items, and means for performing the selected functions on the order list item.

According to another exemplary embodiment, a program product for organizing purchasing data for a plurality of items to be purchased is shown. The program product includes machine-readable program code for causing, when executed, one or more machines to perform a series of method steps. The step include receiving a personal variant including search criteria associated with retail items to be used in populating an order list, populating an order list based upon the personal variant, displaying the order list including retails items satisfying criteria in the personal variant, receiving a selection of order list items and providing a list of functions or applications that associated with the selected order list items, and performing the selected functions on the order list item.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Figure 1:
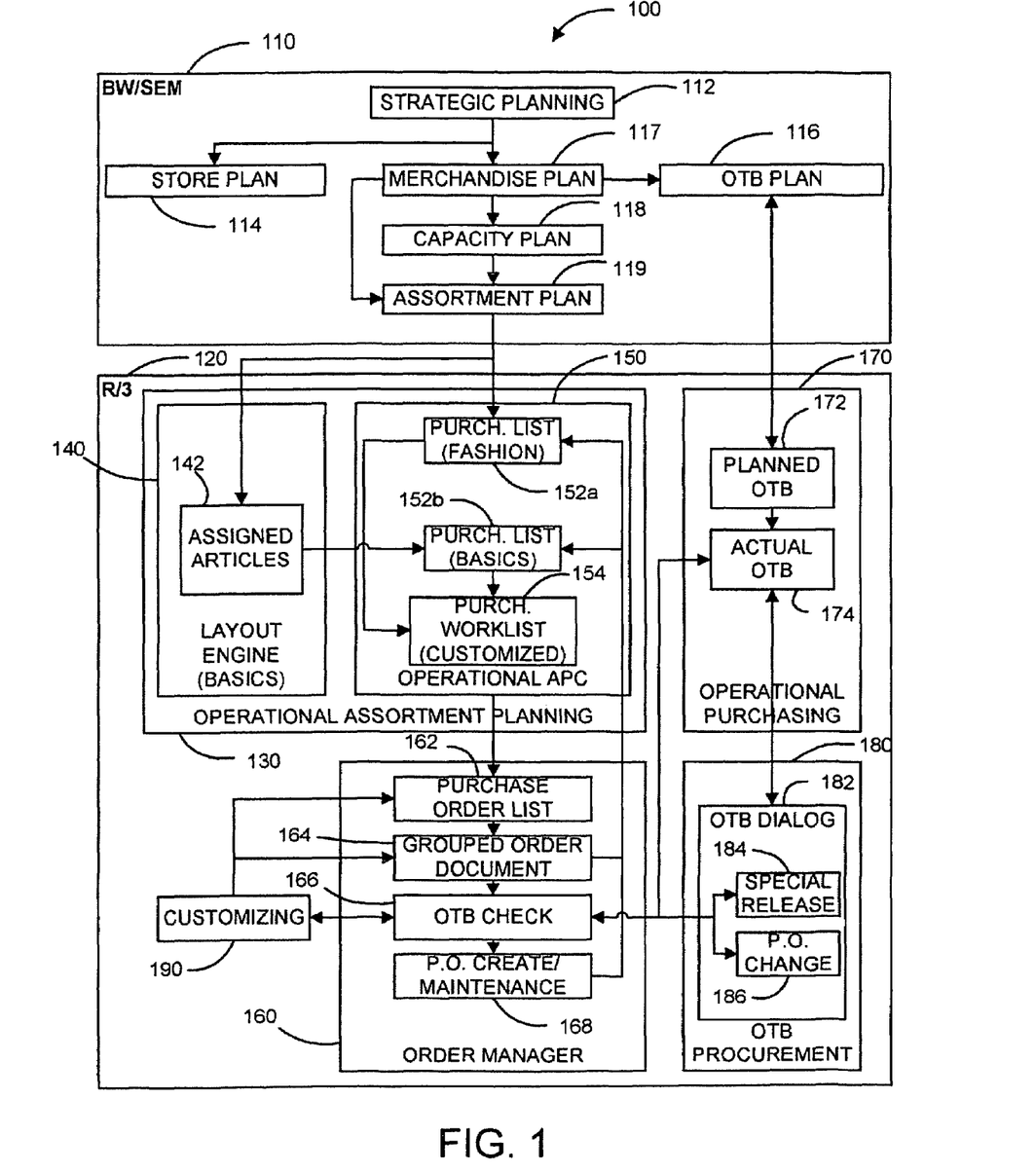
FIG. 1 is an data flow diagram illustrating a system for facilitating planning and procurement of retail sales articles and services according to an exemplary embodiment.

FIG. 1 illustrates a system 100 for facilitating planning and procurement of retail sales articles and services according to an exemplary embodiment. System 100 is illustrated as including a back end system 110 (identified as "BW/SEM") and a front end system 120 (identified as "R/3"). In another embodiment, a single integrated system may be used in place of back end system 110 and front end system 120. System 100 may be implemented as a single system, a distributed system, or any combination thereof. System 100 may be implemented using a single computing system, a plurality of computing systems, software, hardware, or any other system or combination of systems to perform the functions described herein. System 100 may be used, for example, to generate and manage purchase orders for retail sales articles and services using a purchase order management workbench.

Back end system 110 is a data repository configured to receive, sort, process, and store retail sales data, as well as to facilitate planning, provide reporting, and provide other functions associated with managing sales data using one or more functions and/or components. For example, in the illustrated embodiment, back end system 110 includes a strategic planning function 112. Strategic planning function 112 may be used to facilitate an overall business financial plan which defines the retailer's financial goals (e.g., revenues, gross margins, etc.), planned expenses (e.g., inventory, marketing, etc.), and budgets. Accordingly, strategic planning function 112 may be used to generate a store plan 114, an "Open To Buy" (OTB) plan 116, a merchandise plan 117, a capacity plan 118, and an assortment plan 119. According to other exemplary embodiments, back end system 110 may include additional, fewer, and/or different functions.

Store plan 114 may be a plan in which revenues and costs are based on factors within a store hierarchy such as regional marketing, competition, demographic shifts and preferences, and events. OTB plan 116 is derived from merchandise plan 117 and may be a plan designed to maximize turnover potential and minimize capital investment and stockholding costs. OTB planning data may include, for example, an extrapolated amount of available budget for procuring a retail sales article. Merchandise plan 117 may define target purchasing, sales, margin, and inventory levels that are consistent with the overall business plan. Capacity plan 118 is derived from merchandise plan 117 and may be a plan which takes into account the available shelf and/or floor space in a particular store or group of stores in order to determine an optimal number of certain types of retail sales articles to be procured for the store or group of stores.

Assortment plan 119 is based on merchandise plan 117 (and optionally on capacity plan 118 for certain articles) and may be a plan which defines ranges of retail sales articles (e.g., colors and sizes) that may be assigned to a particular grouping of stores. Assortment plan 119 may form the basis for selecting, procuring, and allocating quantities of particular retail sales articles. For example, in the illustrated embodiment, assortment planning data from assortment plan 119 is provided to front-end system 120 in order to facilitate generation and management of purchase orders for the associated retail sales articles.

Front end system 120 is communicatively coupled to back end system 110 and is similarly configured to receive, sort, process, and store retail sales data, as well as to facilitate planning, provide reporting, and provide other functions associated with managing sales data using one or more functions and/or components and in conjunction with back end system 110. For example, in the illustrated embodiment, front end system 120 includes operational assortment planning system 130, order manager system 160, operational purchasing system 170, and OTB procurement system 180. According to other exemplary embodiments, front-end system 120 may include additional, fewer, and/or different functions.

Operational assortment planning system 130 is configured to receive strategic planning data, such as merchandise plan data 117, capacity plan data 118, and assortment planning data 119, from back end system 110, to facilitate refinement and/or addition of detail to the strategic planning data (e.g., specific retail sales articles and quantities to be procured for specific stores during specific periods), and to distribute the data to other downstream processes. In the illustrated embodiment, operational assortment planning system 130 includes a layout engine 140 and an operative assortment planning and control (APC) engine 150. Data from layout engine 140 is passed on to APC engine 150 where it is processed and distributed to downstream processes.

Layout engine 140 is configured to receive strategic planning data from back end system 110, such as capacity data 118 and assortment planning data 119, and to use this data to assign, for example, certain types of retail sales articles to specific locations or layouts according to the available capacity in a store or group of stores. For example, in the illustrated embodiment, layout engine 140 may be used to assign basic, repeat, or "stackable" retail sales articles to a particular layout according to available capacities. In other embodiments, layout engine 140 may be used in conjunction with other types of retail sales articles. Layout data, such as assignments 142 of specific retail sales articles to a particular layout is then passed on to APC engine 150.

APC engine 150 is configured to receive strategic planning data from back end system 110 via an inbound interface, and/or assigned article data 142 from layout engine 140, and to determine groupings and quantities of specific retail sales articles that are to be procured during a specific period and delivered to a specific store or group of stores. By way of example, the following strategic planning data may be "pushed" (or written) or "pulled" (or read) by APC engine 150:

(i) Key performance indicator "fixed initial stock-up" (on a quantity and value basis: purchase price, sales price) at various levels (e.g., article hierarchy node, season/season year, rollout, global assortments assigned to the hierarchy node) Fixed initial stock-up represents fixed quantities of new merchandise to be procured from a capacity standpoint.

(ii) Key performance indicator "variable initial stock-up" on a quantity and value basis at the same levels. Variable initial stock-up represents quantities of new merchandise to be procured from a sales standpoint (e.g., forecast sales).

(iii) Key performance indicator "put away quantity" on a quantity and value basis at various levels (e.g., article hierarchy node, season/season year, rollout, distribution center). Putaway quantity represents quantities of an article that are not to be shipped directly to a store, but rather are to be shipped to a distribution center first.

(iv) The number of different generic articles (or single articles) per key performance indicator in the assortments (assortment breadth).

APC engine 150 uses the strategic planning data received from back end system 110 and/or assigned article data 142 received from layout engine 140 to generate output data including planned assortments/store groups that, upon release, are pushed to downstream processes. Output data from APC engine 150 may also include one or more purchasing lists 152 of various types. For example, in the illustrated embodiment, APC engine 150 uses strategic planning data received from back end system 110 to generate one or more purchasing lists 152*a* for fashion retail sales articles, and uses assigned article data 142 from layout engine 140 to generate one or more purchasing lists 152*b* for non-fashion retail sales articles such as basics or stackable merchandise.

Purchasing list 152 is a list of retail sales articles and corresponding planned purchasing quantities for selected planning levels (e.g., article hierarchy node/season, season year/rollout/assortment type) in APC engine 150. Each purchasing list 152 includes one or more purchasing list items, which represent the smallest possible unit in each purchasing list. A purchasing list item may include a generic article, variants of the generic article (e.g., color or size ranges), or single articles. A purchasing list item may also include planned quantities that are planned within a purchasing list for a specific store delivery date for the various global assortments and key performance indicators. By way of example, each purchasing list item may include the following information:

(i) Purchasing list item number or identifier. This number allows communication between APC engine 150 and the various operative applications.

(ii) Article number or identifier.

(iii) Characteristic 1 (e.g., "article number-characteristic level"). A data retention level of this type allows APC engine 150 to save confirmed order quantities at the characteristic level and facilitates confirmation as to whether the order quantities for a certain characteristic value deviate from the planned quantities.

(iv) Market buying number. This number allows tracking of specific generic articles that may be moved from one purchasing list to another.

(v) Prices: purchase price and sales price.

(vi) Currencies (e.g., local currency, vendor currency).

(vii) "Price fixed" indicator. This indicator ensures that price determination is not performed for either the purchase or sales price during order processing.

(viii) Total purchase order quantity for articles—planned and actual quantities (for confirmations from the purchase order) and article/characteristic value.

(ix) Vendor.

(x) Supplying site (e.g., distribution center, location for delivery).

(xi) Dates (e.g., store delivery date, distribution center delivery date, latest possible order date), planned and actual dates.

(xii) Fields for confirmations (e.g., confirmations from downstream processes).

(xiii) Status fields for the purchasing list item (e.g., status information from downstream processes).

Figure 7:
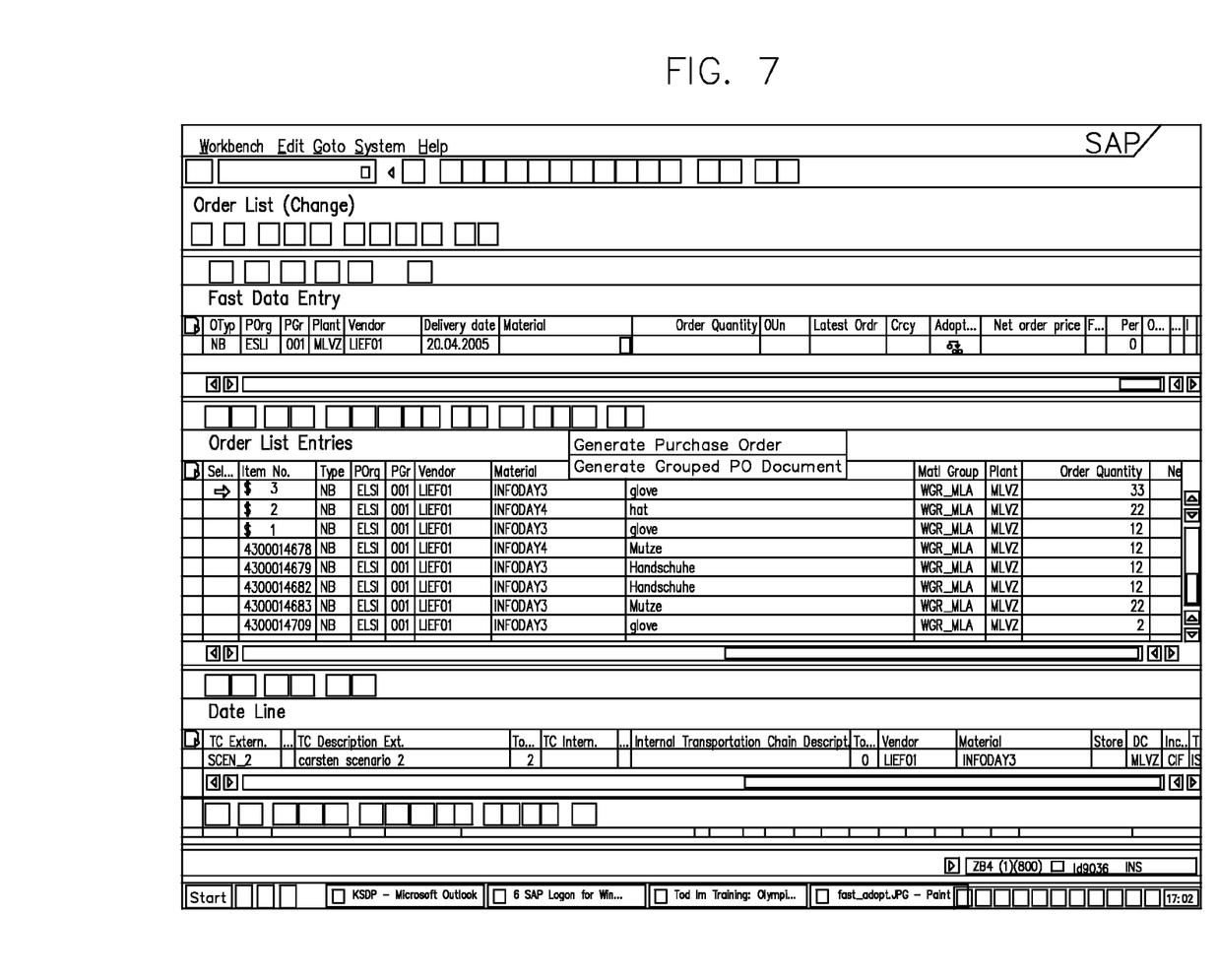
FIG. 7 is an order generator interface configured to include one or more toolbar icons associated with application to be performed using the generated listing of order list items, according to an exemplary embodiment

A portion of an exemplary purchasing list 152 is illustrated in FIG. 7. In this embodiment, data can be entered in purchasing list 152 at three levels: generic article level, color (or size) level, and variant level. The color level may serve as entry help and an inheritance level only, i.e., it is not necessarily a data retention level. In any case, a purchasing list can contain more than one entry for the same article (different delivery dates).

Once the purchasing list items in each purchasing list 152 are compiled and released using APC engine 150, the released purchasing list items are grouped together in a purchasing worklist 154 for transfer to one or more downstream processes. At this point, if a released purchasing list item is cancelled, it may be removed from the worklist. The remaining items in purchasing worklist 154 may then be transferred to one or more downstream processes. This transfer of released purchasing list items may take place automatically at regularly scheduled intervals (e.g., nightly, weekly, etc.) or other intervals.

The transfer of each released purchasing list item may also be customized such that certain data for each released purchasing list item may be included or excluded from transfer, or may be written to a specific location in a downstream process. For example, in one embodiment, the relevant data transferred from APC engine 150 for each released purchasing list item may include:

(i) Purchasing list item number or identifier;

(ii) Article number or identifier;

(iii) Assortment number or identifier;

(iv) Quantity and unit of measure;

(v) Dates (latest) store delivery date, distribution center delivery date, (latest possible) order date;

(vi) Supplying site (e.g., distribution center, location for delivery);

(vii) Vendor; and (viii) Prices that will only apply to a purchase order generated from the purchasing list item.

Order manager system 160 is configured to receive data from APC engine 150 in the form of released purchasing list items, and to generate a corresponding purchase order list 162. According to one embodiment, order manager system 160 creates a corresponding item in purchase order list 162 for each released purchasing list item, article and supplying site (distribution center). This makes it possible to update the data in purchase order list 162 when changes are made in APC engine 150. Because the total purchase order quantity has to be added to order list 162, the planned quantity per assortment may be multiplied by the number of stores assigned to that assortment. This calculation may be performed automatically to update the total purchase order quantity data before it is stored in order list 162. The suitable supplying site (supply source) may also be determined for each store. Once each released purchasing list item is successfully written to the order list, a confirmation is sent to APC engine 150 (e.g., as a status field for the corresponding purchasing list item). Items may also be manually added to purchase order list 162 as "ad-hoc" purchase order list items.

Items in purchase order list 162 for which a purchase order is to be generated are transferred to a grouped procurement list 164. In one embodiment, items in purchase order list 162 for which a purchase order is to be generated may be grouped together for transfer to grouped procurement document 164 according to selected criteria. Grouping criteria for creating and changing purchase orders may include, for example, delivery period, delivery date, contract only, and OTB budget only. Once an item has been transferred to the grouped procurement document 164, a confirmation is sent to APC engine 150 (e.g., as a status field for the corresponding purchasing list item) and the item is removed from purchase order list 162.

Once grouped order document 164 has been prepared, order manager 160 performs an OTB check 166 to verify that budgeted funds are available such that a purchase order may be generated. If OTB check 166 is successful, a confirmation may be sent to APC engine 150 (e.g., as a status field for the corresponding purchasing list item) and order manager system 160 may then generate a purchase order 168. If OTB check 166 is not successful, a failure message may be sent to APC engine 150 (e.g., as a status field for the corresponding purchasing list item). The grouped purchase order document may then need to be modified and/or specially authorized such that a purchase order may be generated.

Operational purchasing system 170 is configured to perform OTB check 166 in conjunction with order manager system 160. Operational purchasing system 170 includes planned OTB data 172 and actual OTB data 174. Planned OTB data may include OTB plan data 116 received by operational purchasing system 170 from back end system 110. Operational purchasing system 170 uses planned OTB data 172 and actual OTB data 174 to determine whether budgeted funds are available such that a purchase order may be generated for a particular grouped order document 164.

In an exemplary embodiment, the activation of the OTB check may utilize data from the OTB planning system. The OTB procurement process may result in a negative OTB check. In an exemplary embodiment, a negative OTB check may result in terminating the OTB with errors. In another exemplary embodiment, a negative OTB check may allow for the alternative of reducing a quantity to change the negative OTB check which allows the OTB procurement to be implemented. In another exemplary embodiment, a negative OTB check may allow for the alternative of canceling an item or document to change the negative OTB check which allows the OTB procurement to be implemented. In another exemplary embodiment, a negative OTB check may allow for the alternative of carrying out the OTB procurement with reservation of the available OTB amount which allows the OTB procurement to be implemented. In another exemplary embodiment, a negative OTB check may allow for the alternative of carrying out the OTB procurement without reservation of the available OTB amount.

OTB procurement system 180 is in communication with order manager system 160 and operational purchasing system 170 and is configured to provide options for successfully generating a purchase order for grouped procurement document 164 when OTB check 166 is not successful. For example, in the illustrated embodiment, OTB procurement system 180 includes OTB dialog 182, which provides options to either initiate a special release 184 or a purchase order change 186. When special release 184 is initiated, grouped procurement document 164 is forwarded to, for example, an appropriately authorized individual for approval. When purchase order change 186 is initiated, grouped procurement document 164 may be modified. Such modifications may include changes in quantities, changes in delivery dates, changes in price, etc.

Figure 2:
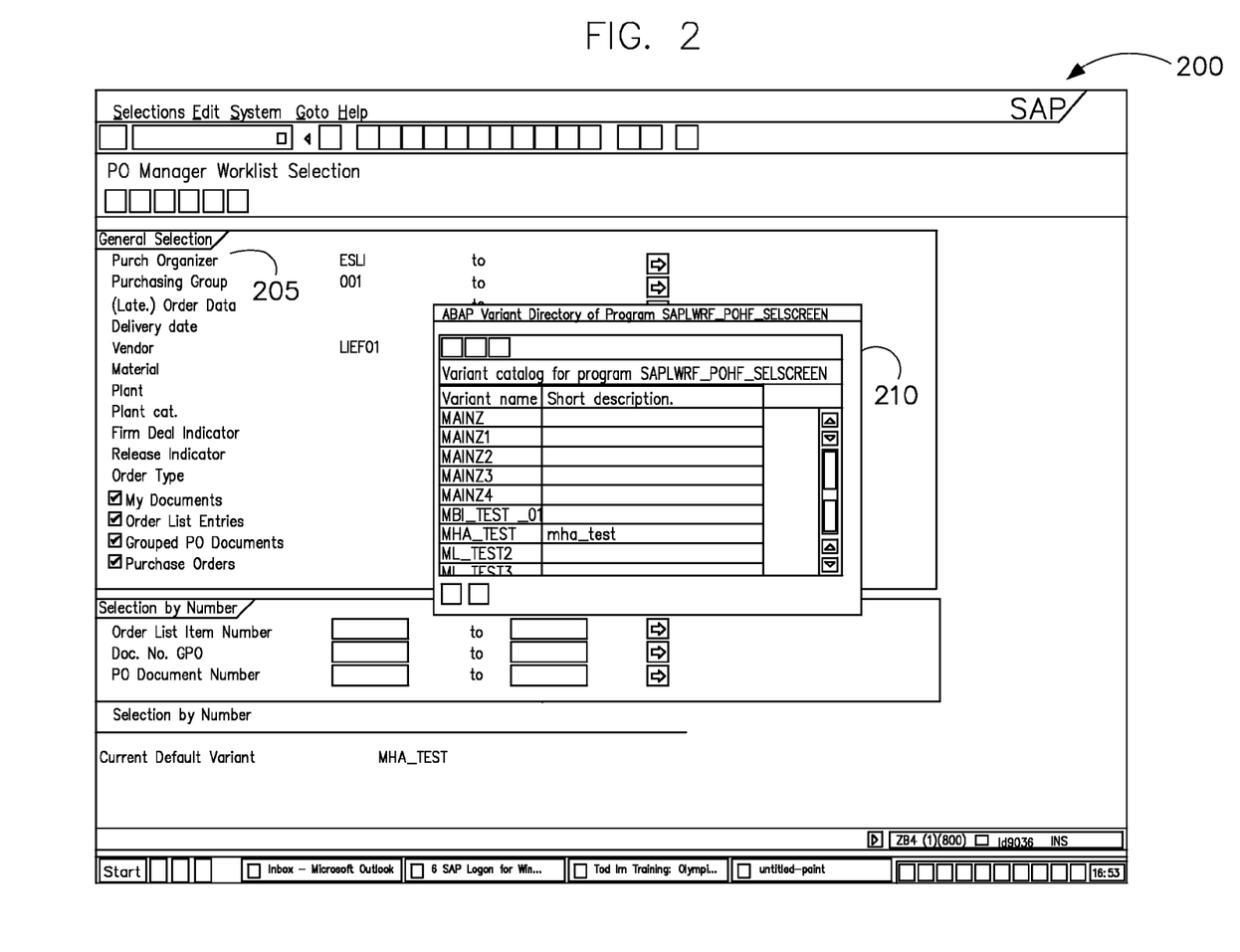
FIG. 2 is a worklist selection screen configured to allow a user to select a worklist of order list items based on a personal variant, according to an exemplary embodiment.

Referring now to FIG. 2, a worklist selection screen 200 is shown, according to an exemplary embodiment. The worklist selection screen may be accessed through order manager system 160 to generate a worklist of order list items. Order list items may be any type of retail or other items that may be include in a purchase order and information associated with those items. Worklist selection interface 200 is configured to allow a user to select a worklist of order list items based on a personal variant. The worklist of order list items may be automatically populated according to some criteria, such as order list items requiring some action within the next 7 days, or may be manually populated by a user. The personal variant may be search parameters to be used in populating the worklist, such as the organization, the type of order list items, purchasing organization, purchasing group, order date, delivery date, vendor, material, plant, plant category, firm deal indicator, release indicator, order type, etc. The search parameters may be displayed in a listing of user defined input fields 205, allowing a user to populate the input fields with search criteria that are currently of interest. The personal variant may further include additional user-defined parameters. For example, a user may wish to a set of user defined variables indicating the display format to be used in display the order list items. Upon selection, a user may save the personal variant to be used in future generation of worklists. Alternatively, a user may select from a previously created personal variant. For example, worklist selection interface 200 illustrates a personal variant pop up window 210 listing previously defined personal variants.

Figure 3:
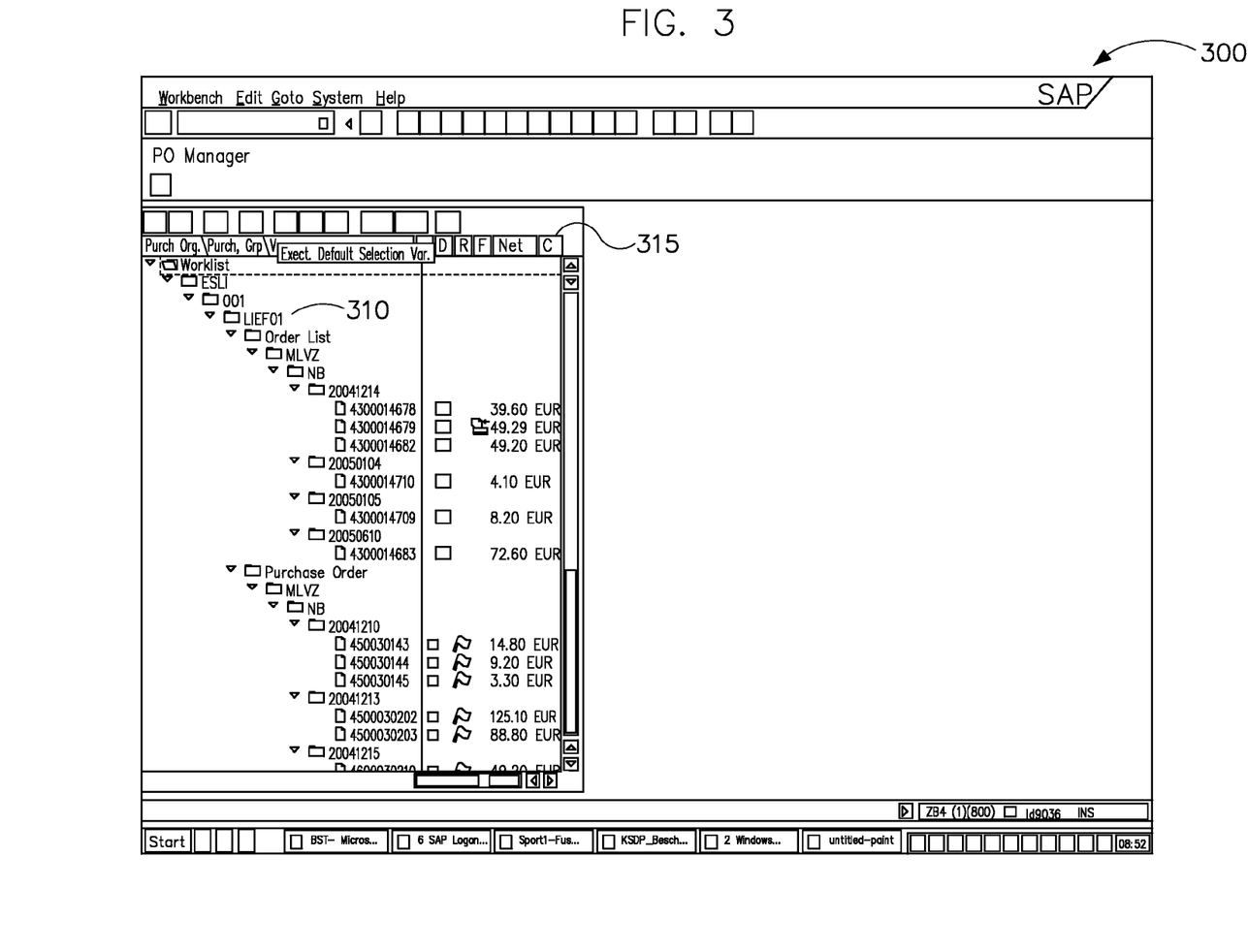
FIG. 3 is a worklist interface configured to allow a user to manage order list items, according to an exemplary embodiment.

Referring now to FIG. 3, a worklist interface 300 configured to allow a user to manage order list items is shown, according to an exemplary embodiment. Worklist interface 300 may be configured to display the order list items for which a user is currently responsible. The order list items may be ordered and displayed according to any useful criteria. For example, as shown in FIG. 3, worklist interface 200 is configured to display a plurality of order list items in a hierarchical listing 310. The hierarchical listing 310 may include divisions or branches according to a sort criteria selected by the user. Potential sort criteria may include and is not limited to, a purchase order date, a purchase order principal, a purchase order vendor, etc. According to an alternative criteria, the listing of order list items may be further sorted according to the calculations made regarding the order list items by one or more order list items management applications. For example, the order list items may be sorted according to purchase orders that have failed a budgetary constraint using a open-to-buy budget approval application or workbench, order list items that are scheduled to be delivered based on results obtained from a procurement application or workbench, etc. Order list items may further be sorted according to the workload of the user, i.e., worklist interface 300 may be configured to display all of the purchase orders requiring immediate action by the user of interface 300.

Worklist interface 300 may further be configured to display a listing of information or status indicators associated with the displayed order list items. For example, as shown in FIG. 3, worklist interface 300 may be configured to display each order list items that is displayed in hierarchical listing 310 including status columns 315. Exemplary status information may include a delivery status, a release status, aggregated cost data, the currency used in displaying the costs, etc. The information may be displayed using text, icons, or any other type of indicator.

Figure 4:
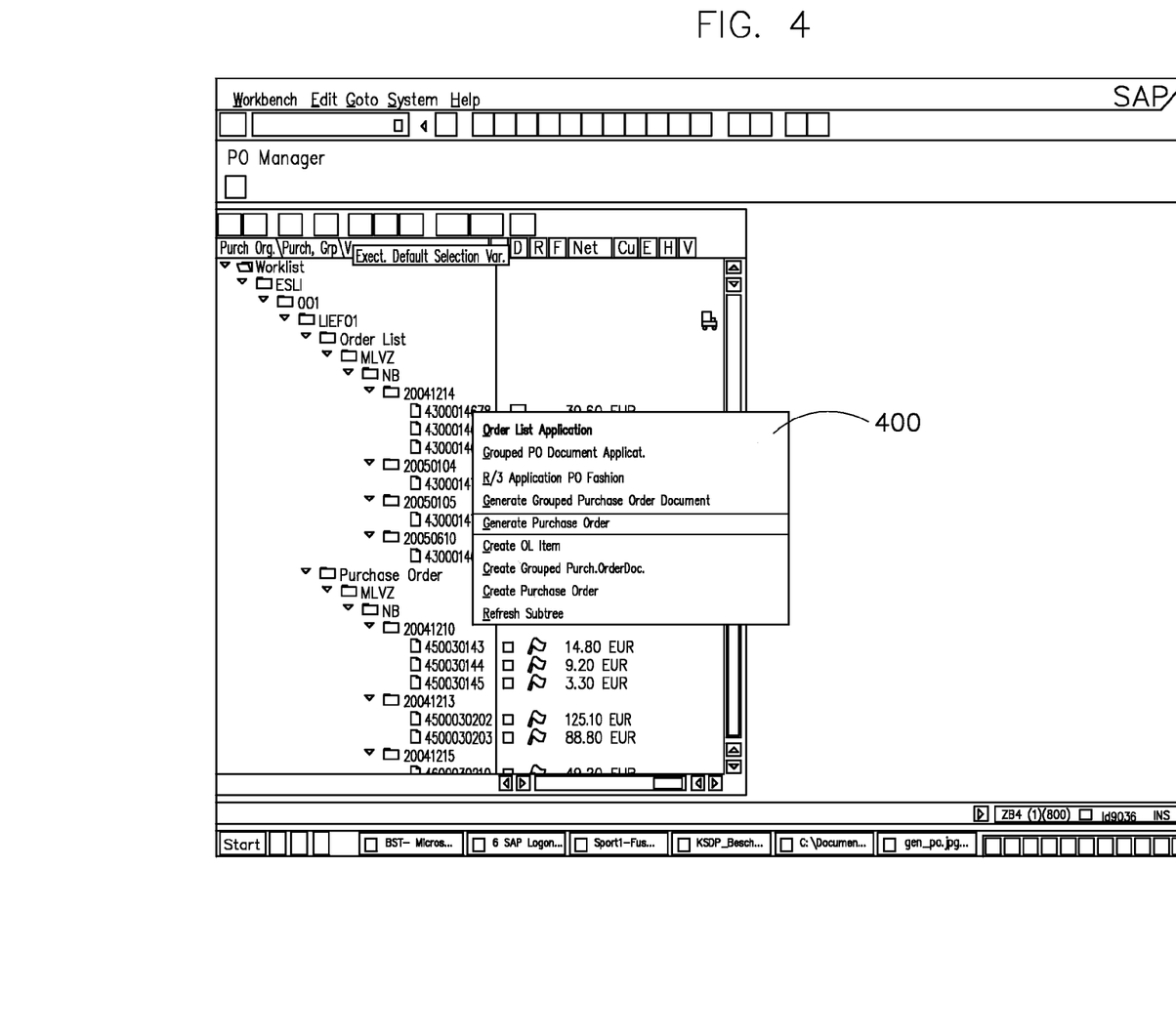
FIG. 4 is the worklist interface of FIG. 3, configured to allow a user to perform one or more functions associated with the purchase order list in the worklist, according to an exemplary embodiment.

Referring now to FIG. 4, worklist interface 300 may be configured to allow a user to perform one or more functions associated with the purchase order in the worklist. As shown in FIG. 4, a user may select one or more purchase orders in hierarchical listing 310, a perform a right click to display a listing 400 of functions that can be performed on the selected purchase orders. Exemplary function associated with listing 400 may include, but are not limited to, generating a grouped purchase order document, generating a purchase order, creating an OL item, creating a grouped purchase order document, and creating a purchase order. Listing 400 may further include links to additional applications including functionality that may be performed on the purchase orders. The applications may include, but are not limited to, an order list application, a grouped purchase order application, a R/3 application purchase order, etc. Alternatively, listing 400 may be displayed in a toolbar that is displayed at the top of interface 300 upon selection of the one or more order list items. For example, the user may select the application to create a grouping of order list items.

Figure 5:
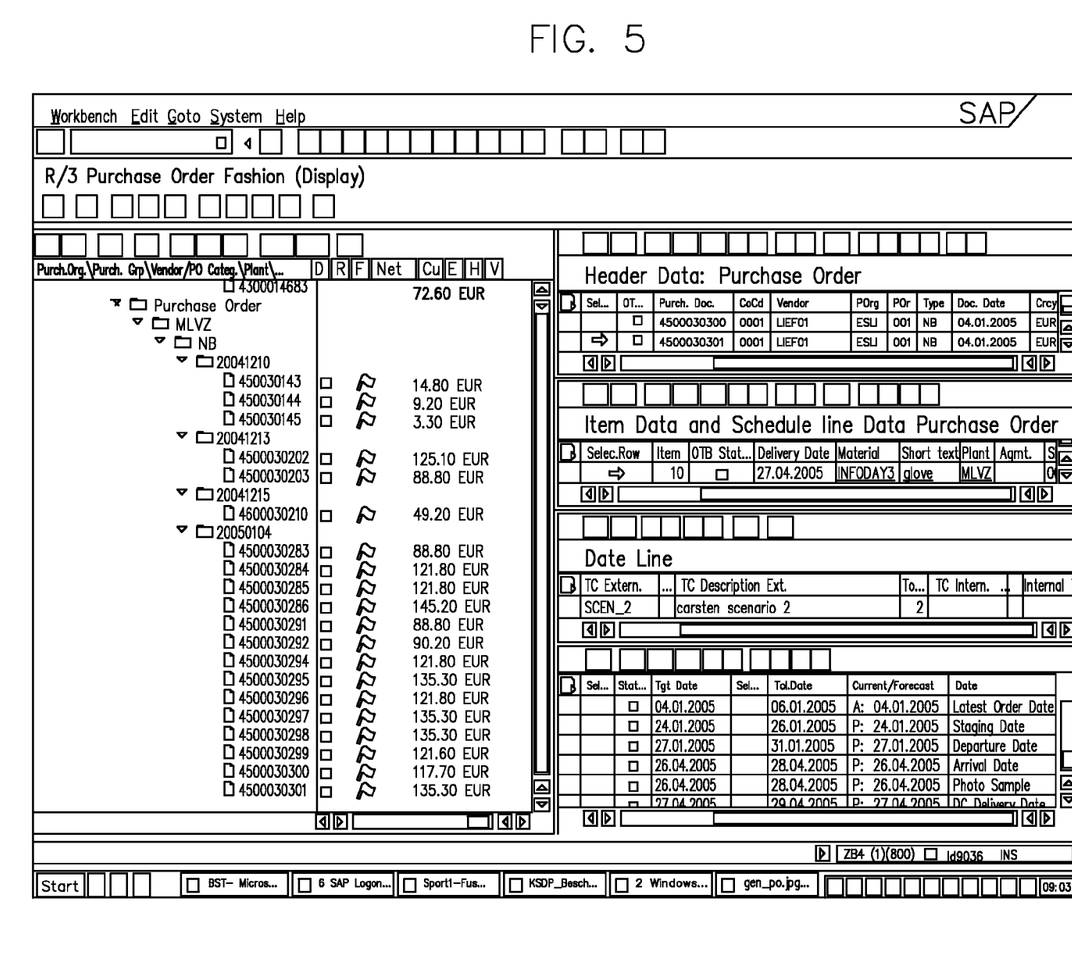
FIG. 5 is the worklist interface of FIG. 3, further displaying an application interface based on a selected function, according to an exemplary embodiment.

Referring now to FIG. 5, upon selection of an application to be performed on the selected order list items, an application interface 500 may be opened displaying the application interface of the application or function selected from listing 400. The application interface may be automatically populated with information based on the selected order list items shown in FIG. 4.

Figure 6:
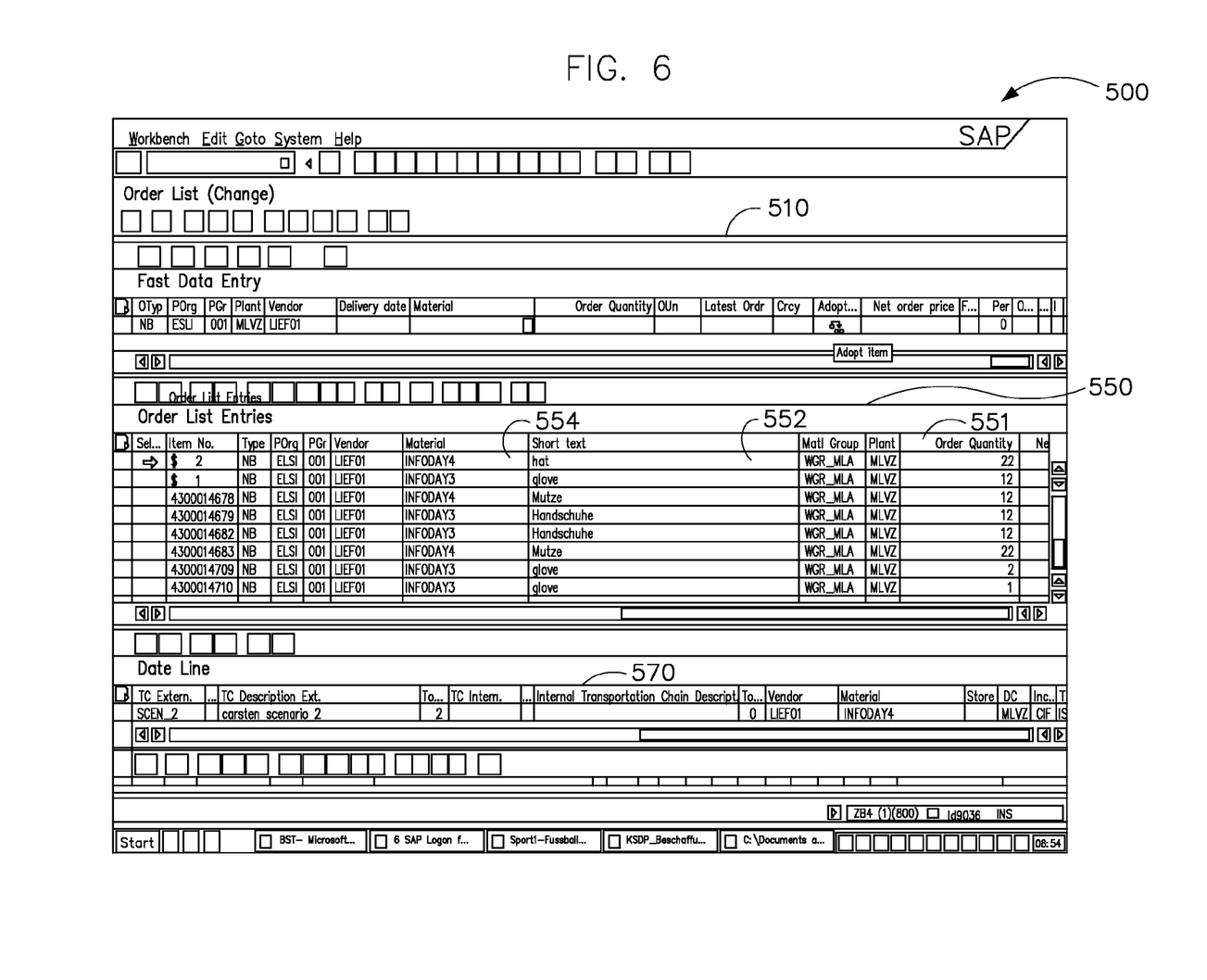
FIG. 6 is the application interface of FIG. 3 after the worklist interface has been closed, according to an exemplary embodiment.

Referring now to FIG. 6, if desired, the user may close hierarchical listing 310 such that only the application interface 500 is displayed in interface 300. According to the example shown in FIG. 6, the application is a purchase order generator and application interface 500 becomes an order generator interface. Purchase order generator interface 500 is shown as including a fast data entry interface 510, a purchase order list 550, and a date line interface 570. Although particular interface as shown in a particular configuration within purchase order generator interface 500, it should be understood that the interface can be provided according to any configuration, and any type of interface configured to implement or facilitate the function described herein can alternatively be provided.

Where a user desires to add new items to the order list 550, the user may utilize fast data entry interface 510 to generate a new order list item. Fast data entry interface 550 is configured to include a plurality of input fields to allow a user to enter all of the information needed to create a new order list item. Exemplary input fields may include, but are not limited to, an O type, a purchasing organization, a purchasing group, a plant, a specific vendor identifier, a projected delivery date, a material name, an order quantity, a net order price, applicable currency, etc. A user may populate all or less than all of the entry fields to create a new order list item.

In the illustrated embodiment, purchase order list 550 is formatted as a table. Purchase order list 550 includes a header row 551 as well as a row 552 for each purchasing list item added to the purchase order. For example, in the illustrated embodiment, purchase order list 550 includes rows 552a-552h. Purchase order list 550 also includes columns 554 for relevant purchasing data associated with each purchasing list item in the purchase order list. For example, in the illustrated embodiment, purchase order list 550 includes columns 554a-554k. Column 554b, labeled "Item No." in header row 251, includes the item number from which the purchase order list line item was generated. The item number may be representative of an Stock Keeping Unit (SKU) number. Column 254b, labeled "Type" in header row 251, includes [?] Columns 254c and 254d, labeled "POrg" and "PGr" in header row 251, includes the purchasing organization and purchasing group, respectively responsible for the origin of each purchase order list line item. Column 254d, labeled "Vendor" in header row 251, lists the vendor for each purchase order list line item. Column 254e, labeled "Material" in header row 251, includes the specific indicator for each purchase order list line item. Column 254f, labeled "Short text" in header row 251, provides a short textual description of each purchase order list line item. Column 254g, labeled "Order Quantity" in header row 251, includes the required quantity for each purchase order list line item. Additional columns may be included to display any required or desirable information, such as the appropriate unit of measure for each purchase order list line item (e.g., cartons, pieces, etc.), the delivery destination for each purchase order list line item, etc. Of course, in other embodiments, additional, fewer, and/or different columns and rows of information or data may be displayed.

Referring now to FIG. 7, order generator interface 500 may further be configured to include one or more toolbar icons associated with application to be performed using the generated listing of order list items, according to an exemplary embodiment. For example, as shown in FIG. 7, a user may select one or more order list items and select a function to be performed using those purchase order. A drop down list of applications may allow a user to generate a purchased including the selected items in the order items listing.

Advantageously, order manager system 160 allows a user to perform all of the functions involved with the creation and maintenance of purchase orders. All or a desired subset of the information relating to purchase orders for the user is displayed in a single interface. The interface is configured to allow a user to easily select functions to be performed on the purchase orders. Advantageously, any information necessary to perform the selected function can automatically be provided by order manager system 160 in calling the selected function.

The use of a purchase order list provides the advantage of organizing purchasing data for retail sales articles and/or services to be purchased such that the generation of purchase orders for these articles and/or services may be conveniently managed. Improved purchase order management and organization is achieved by providing for the sorting of sales articles or services in the purchase order list according to a particular type of purchasing data related to the sales articles or services in the list, such as required order and delivery dates. Improved purchase order management and organization is further achieved by providing for the updating of the purchase order list to include data related to a specific purchase order generated for a particular retail sales article or service. In this way, a business may carefully plan and schedule purchasing orders for retail sales articles and services to ensure on-time procurement or scheduling.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Machine-readable media for managing purchasing orders for a plurality of items to be purchased using an automated process, the machine-readable media comprising program code stored therein executable by one or more machines to perform the automated process for managing purchasing orders, the automated process comprising:

receiving a personal variant including search criteria associated with retail items to be used in populating an order list;
populating a purchase order list based upon the personal variant;
displaying the purchase order list including order list items satisfying criteria in the personal variant;
receiving a selection of purchase order list items and providing a list of functions associated with the selected purchase order list items;
determining a selected function;
performing the selected functions on the order list item;
comparing a cost of a purchase order to a budget;
transmitting an approval request based on the cost of the purchase order exceeding the budget;
receiving an approval responsive to the approval request;
transmitting the purchase order to a supplier based on the approval; and
storing at least one of the personal variant, the order list, the purchase order list, or the selected function;
wherein the approval comprises instructions for approving the purchase order where the cost of the purchase order exceeds the budget.

2. The machine-readable media of claim 1, wherein the purchasing order list includes at least one of an item identifier, a quantity, a price, an order date, a delivery date, or a delivery location for each order list item.

3. The machine-readable media of claim 1, wherein the functions include at least one of generating a grouped purchase order document, generating a purchase order, creating an OL item, creating a grouped purchase order document, or creating a purchase order.

4. The machine-readable media of claim 1, wherein the items to be purchased include retail sales articles.

5. A system for organizing purchasing data for a plurality of items to be purchased, the system comprising:

means for receiving a personal variant including search criteria associated with retail items to be used in populating an order list;
means for populating an order list based upon the personal variant;
means for displaying the purchase order list including order list items satisfying criteria in the personal variant;
means for receiving a selection of order list items and providing a list of functions associated with the selected order list items;
means for determining a selected function;
means for performing the selected functions on the order list item;
means for comparing a cost of a purchase order to a budget;
means for transmitting an approval request based on the cost of the purchase order exceeding the budget;
means for receiving an approval responsive to the approval request;
means for transmitting the purchase order to a supplier based on the approval; and
means for storing at least one of the personal variant, the order list, the purchase order list, or the selected function;
wherein the approval comprises instructions for approving the purchase order where the cost of the purchase order exceeds the budget.

6. The system of claim 5, wherein the purchasing order list includes at least one of an item identifier, a quantity, a price, an order date, a delivery date, or a delivery location for each order list item.

7. The system of claim 5, wherein the functions include at least one of generating a grouped purchase order document, generating a purchase order, creating an OL item, creating a grouped purchase order document, or creating a purchase order.

8. The system of claim 5, wherein the purchasing data includes data manually entered by a user.

9. The system of claim 5, wherein the order list items include retail sales articles.

10. A program product for organizing purchasing data for a plurality of items to be purchased, the program product comprising machine-readable program code for causing, when executed, one or more machines to perform the following method steps:

receiving a personal variant including search criteria associated with retail items to be used in populating an order list;

populating an order list based upon the personal variant;

displaying the order list including retails items satisfying criteria in the personal variant;

receiving a selection of order list items and providing a list of functions or applications that associated with the selected order list items;

determining a selected function;

performing the selected functions on the order list item;

comparing a cost of a purchase order to a budget;

transmitting an approval request based on the cost of the purchase order exceeding the budget;

receiving an approval responsive to the approval request;

transmitting the purchase order to a supplier based on the approval; and storing at least one of the personal variant, the order list, the purchase order list, or the selected function;

wherein the approval comprises instructions for approving the purchase order where the cost of the purchase order exceeds the budget.

11. The program product of claim 10, wherein the purchasing data includes at least one of an item identifier, a quantity, a price, an order date, a delivery date, or a delivery location.

12. The program product of claim 10, wherein the functions include at least one of generating a grouped purchase order document, generating a purchase order, creating an OL item, creating a grouped purchase order document, or creating a purchase order.

13. The program product of claim 10, wherein the purchasing data includes data manually entered by a user.

14. The program product of claim 10, wherein the items to be purchased include retail sales articles.

15. The machine-readable media of claim 1, further comprising modifying the purchase order based on the approval and wherein the cost of the purchase order exceeds the budget.

16. The system of claim 5, further comprising means for modifying the purchase order based on the approval and wherein the cost of the purchase order exceeds the budget.

17. The program product of claim 10, further comprising modifying the purchase order based on the approval and wherein the cost of the purchase order exceeds the budget.

* * * * *